A. E. COOK.
PLOW DISK ASSEMBLY.
APPLICATION FILED MAY 28, 1914.
1,158,110.
Patented Oct. 26, 1915.
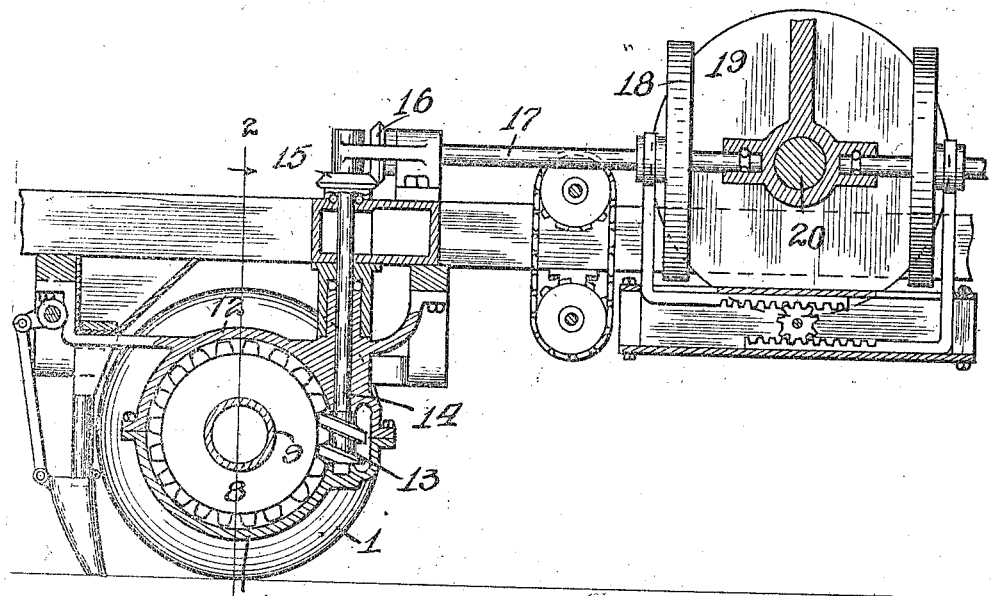
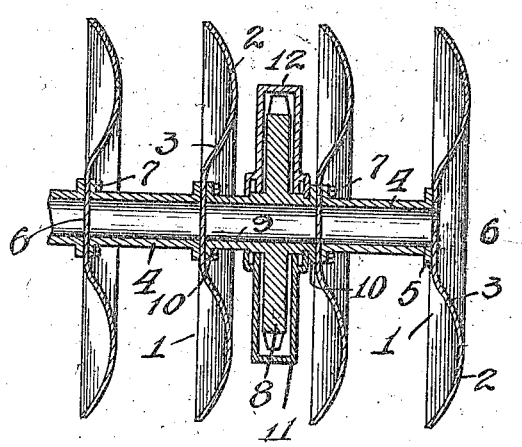

UNITED STATES PATENT OFFICE.

ALBERT E. COOK, OF KANKAKEE, ILLINOIS.

PLOW-DISK ASSEMBLY.

1,158,110.          Specification of Letters Patent.       Patented Oct. 26, 1915.

Original application filed October 23, 1908, Serial No. 459,139. Divided and this application filed May 28, 1914. Serial No. 841,415.

*To all whom it may concern:*

Be it known that I, ALBERT E. COOK, a citizen of the United States, and a resident of the town of Kankakee, in the county of Kankakee and State of Illinois, have invented certain new and useful Improvements in Plow-Disk Assembly; and I do hereby declare that the following is a full, clear, and exact description of the same, reference being had to the accompanying drawings, and to the numerals of reference marked thereon which form a part of this specification.

This application constitutes a division of my co-pending application for patent for "agricultural implements", filed October 23, 1908, Serial No. 459,139, and relates to the improved form of plow disk construction and assembly illustrated in said application.

It is an object of this invention to provide a very durable construction wherein a number of peculiarly shaped plow disks are arranged in alined parallel relation with one another, and connected to move as a single unit when driven from a suitable source of power.

It is also an object of this invention to construct plowing gangs for use on a motor plow wherein the disks are both concave and convex on each of their surfaces, whereby when the disks cut the soil they also serve to elevate the same and turn a furrow.

It is a further object of this invention to construct gangs of plows for a motor plow wherein strong metal disks are rigidly connected one to another by means of sleeve members bolted through the disks to each other.

It is finally an object of this invention to provide a very simple and durable construction in the assembly of disks for gang plows wherein the number of disks in a gang may be readily varied at will by detaching certain ones thereof or connecting additional disks in place, as desired.

The invention (in a preferred form) is illustrated in the drawings and hereinafter more fully described.

In the drawings: Figure 1 is a fragmentary detail partly in elevation and partly in section of one end of a motor plow, showing the driving connections to a gang of plowing disks mounted thereon. Fig. 2 is a section on line 2—2 through the disk plows of Fig. 1.

As shown in the drawings the plowing disks are each denoted by the reference numeral 1, and, as shown in Fig. 2, said disks are curved near their outer margins at the points 2, in one direction, and reversely curved at the points 3, near the central part or hub of the disk. Said disks are connected one to another by tubular sleeve sections 4, provided with flanges 5, at their ends which lie upon the flattened portion 6, of each of said disks and are apertured to receive attaching bolts 7, therethrough, whereby said disks are connected rigidly to one another and to said sleeve sections. However, disposed centrally of the gangs in place of a sleeve member 4, a worm gear 8, is provided which has an extended hub 9, which is flanged at its ends as indicated by the reference numeral 10, similar to the construction of said sleeve portions, and is connected to the adjacent disks in a manner similar to that already described. Housing sections 11 and 12, respectively, are provided for said worm gear 8, and the hub of said gear is rotatably journaled therein. For the purpose of driving said gangs of plow disks by the worm gear 8, which is rigidly attached thereto, a worm 13, is provided which meshes with said gear and is rigidly mounted upon a vertical shaft 14, provided with a bevel pinion 15, driven by another bevel pinion 16. Said bevel pinion 16, is secured upon the end of a shaft 17, which has feathered thereon a friction wheel 18, adapted to contact at different radial distances the main driving disk 19, mounted on the driving shaft 20. However, since the driving connections shown form no part of this invention and are fully described in the parent application already referred to, the details thereof are not entered into here.

The method of connecting the disks together obviously presents an easy method of connecting additional disks in a gang or reducing the number, as desired. Owing to the rigid connection between the disks, and the manner in which the worm gear 8, is c nected b(+ween the disks on each side tl reof, it is )bvious that the drive is transn ted to all of the disks as a unit when said gear is driven. The peculiar construction of the disks, that is to say the double curvature thereof, enables the same to cut into the soil, readily elevating the soil so cut and turning a furrow very similar to the ordinary hand plow.

I am aware that various details of construction may be varied through a wide range without departing from the principles of this invention, and I therefore do not purpose limiting the patent granted otherwise than necessitated by the prior art.

I claim as my invention:

1. In a device of the class described a plurality of plow disks rigidly connected one to another, each of said disks curved convexly and concavely on the surfaces thereof, and driving means forming a connection between certain of said disks.

2. In a device of the class described a plurality of plow disks, sections between each thereof rigidly connected thereto to hold the same in position and cause said disks to move as a unit, driving mechanism integral with one of said sections and means permitting detachment of one or more of the disks.

3. In a machine of the class described plowing gangs, each embracing a plurality of rotatable disks concave between the periphery and the center on one side, and the other side concave at the center to afford a reverse bend in the disks to turn a furrow, shaft sections flanged at the ends to bear against the centers of the disks, a driving gear integral with one of said sections and means connecting the flanges to the disks.

4. In a device of the class described a plurality of plow disks, each of said disks bent concavely on one side and convexly on the other, flanged members rigidly connecting each of said disks together, and a driving gear provided with an extended flanged hub integral therewith for connecting certain of the disks to one another.

5. In a device of the class described a plurality of plow disks rigidly connected one to another, each of said disks curved convexly and concavely on the surfaces thereof, driving means forming a connection between certain of said disks, and housing members for inclosing said driving means.

6. In a machine of the class described plowing gangs, each embracing a plurality of rotatable disks constructed of even thickness throughout, having a concave working face which curves away in one direction from the cutting edge to form an annular depression and which curves in another direction to a point in the plane of the cutting edge of the disk to form a central raised portion having a flat surface substantially in the plane of the cutting edge of the disk, shaft sections flanged at their ends for attachment on said flat surfaces of said disks, and driving means integral with one of said sections for driving said connected disks.

In testimony whereof I have hereunto subscribed my name in the presence of two subscribing witnesses.

ALBERT E. COOK.

Witnesses:
 CHARLES W. HILLS, Jr.,
 FRANK K. HUDSON.